Patented Apr. 27, 1948

2,440,276

UNITED STATES PATENT OFFICE 2,440,276

BREWING METHOD USING ALBEDO IN WORT

Abraham Arnold Klein, Tel Aviv, Palestine

No Drawing. Application December 7, 1944, Serial No. 567,125. In Palestine September 25, 1943

7 Claims. (Cl. 99—52)

According to the present invention albedo from fruit of the genus Citrus, particularly from grapefruit or citron, is used instead of, or in addition to, hops in the manufacture of beer. I have found that the lupulin of hops has in many cases undesirable effects on the human organism. Furthermore hops deteriorate easily. Albedo from citrus fruit can be used instead of hops and the bitter flavour imparted by it to the wort is of a mild and agreeable character.

The albedo can be used in various forms, such as in fresh state, dried and compressed into flakes, ground to powder. Aqueous extracts from albedo can also be used, which may be concentrated before use.

If fresh albedo is used, it is simply added to the wort, about 250–450 grams being added to 100 litres of wort. If dried albedo is used, about 125–250 grams are added to 100 litres of wort.

An aqueous albedo extract is prepared in the following way: Albedo is boiled in water for about two hours and the liquid decanted. The solid is squeezed out and the squeezed out liquid added to the decanted liquid. The liquid is filtered and then concentrated in vacuo to a syrup-like consistency.

I believe that as far as its flavouring capacities are concerned, albedo is superior to hops but according to some opinions, hop oil and hop resin have a preserving effect. Therefore hop oil or hop resin, or both of them may be added to the wort or admixed to the albedo, prior to the latter being added to the wort.

After adding the albedo, the wort is treated as is known in the art in the treatment with hopped wort.

Hops contain tannin which aids the precipitation of proteins in the wort. For a similar effect, it is advisable to admix to the albedo tannin or tannic substances. For example, an extract from dates containing tannin may be added to the aqueous albedo extract or the date extract may be admixed to fresh or dried albedo.

Should it be desired to store the albedo for some time before using it, or if albedo is destined for export, it will be advisable to prepare compressed plates or slabs, which may be made in the following way: To 10 kilos of disintegrated grapefruit albedo is added a solution of 16–32 grams of hop oil in 80–160 grams of alcohol and the whole is thoroughly kneaded. This mass is compressed into plates or slabs. The plates may be coated with gelatine in order to preserve them.

I claim:

1. In the process of brewing beer the step of boiling the wort with the addition of albedo from citrus fruit as flavouring agent.
2. In the process of brewing beer the step of boiling the wort with the addition of albedo from citrus fruit to which hop oil has been admixed.
3. In the process of brewing beer the step of boiling the wort with the addition of albedo from citrus fruit to which hop resin has been admixed.
4. In the process of brewing beer the step of boiling the wort with the addition of albedo from citrus fruit to which tannin containing substances have been admixed.
5. In the process of brewing beer the step of boiling the wort with the addition of an aqueous extract from citrus albedo.
6. A process as claimed in claim 1, in which the albedo used is grapefruit albedo.
7. A process as claimed in claim 1, in which the albedo used is citron albedo.

ABRAHAM ARNOLD KLEIN.

REFERENCES CITED

The following references are of record in the file of this patent:

UNITED STATES PATENTS

| Number | Name | Date |
|---|---|---|
| 1,800,632 | Horst | Apr. 14, 1931 |
| 1,843,321 | Hamburg | Feb. 2, 1932 |
| 1,280,150 | Brodsky | Oct. 1, 1918 |
| 1,479,329 | Snelling | Jan. 1, 1924 |
| 180,692 | Winder et al. | Aug. 1, 1876 |

OTHER REFERENCES

"Pectin in nature and industry," by G. H. Baker, Scientific Monthly, Jan. 1935; pages 48 to 54.

American Handy Book of the Brewing, Malting and Auxiliary Trades, by Wahl-Henius, vol. 1, third edition, published by Wahl-Henius Institute, 1908, page 493.